United States Patent
Watanabe

(10) Patent No.: US 8,010,841 B2
(45) Date of Patent: Aug. 30, 2011

(54) DIAGNOSIS APPARATUS, DIAGNOSIS METHOD, AND STORAGE MEDIUM

(75) Inventor: Hidehiko Watanabe, Ebina (JP)

(73) Assignee: Ricoh Company Limited, Tokyo (JP)

( * ) Notice: Subject to any disclaimer, the term of this patent is extended or adjusted under 35 U.S.C. 154(b) by 327 days.

(21) Appl. No.: 12/104,962

(22) Filed: Apr. 17, 2008

(65) Prior Publication Data

US 2009/0327814 A1    Dec. 31, 2009

(30) Foreign Application Priority Data

Apr. 18, 2007  (JP) .................................. 2007-109550

(51) Int. Cl.
*G06F 11/00* (2006.01)
(52) U.S. Cl. ...................................... 714/26; 714/38.14
(58) Field of Classification Search .................... 714/26, 714/27, 38.1–38.14
See application file for complete search history.

(56) References Cited

U.S. PATENT DOCUMENTS

| 5,491,791 | A  | * | 2/1996 | Glowny et al. ................. 714/37 |
| 6,357,017 | B1 | * | 3/2002 | Bereiter et al. ................. 714/27 |
| 7,716,527 | B2 | * | 5/2010 | Drouet et al. ................... 714/27 |
| 2004/0148379 | A1 | | 7/2004 | Ogura |
| 2006/0248389 | A1 | * | 11/2006 | Thaler et al. .................... 714/26 |
| 2007/0050673 | A1 | * | 3/2007 | DiBartolomeo et al. ....... 714/27 |

* cited by examiner

*Primary Examiner* — Bryce P Bonzo
(74) *Attorney, Agent, or Firm* — Oblon, Spivak, McClelland, Maier & Neustadt, L.L.P.

(57) ABSTRACT

A diagnosis apparatus is disclosed that is able to promote productivity of a diagnosis of the target program which may be for an image forming apparatus such as a printer, a copier, or a fax. The diagnosis apparatus uses a diagnosis program which acquires log information of a target program at runtime. The diagnosis program is sent to a situation where the diagnosis program is to be executed. Further, the diagnosis apparatus includes a memory unit configured to store correspondence data between the diagnosis program and program selection information, where the program selection information is used for selecting the diagnosis program. Also included is a selecting unit which selects the diagnosis program based on the correspondence data, a sending unit which sends the diagnosis program to the situation, and a receiving unit which receives the log information from the diagnosis program.

10 Claims, 14 Drawing Sheets

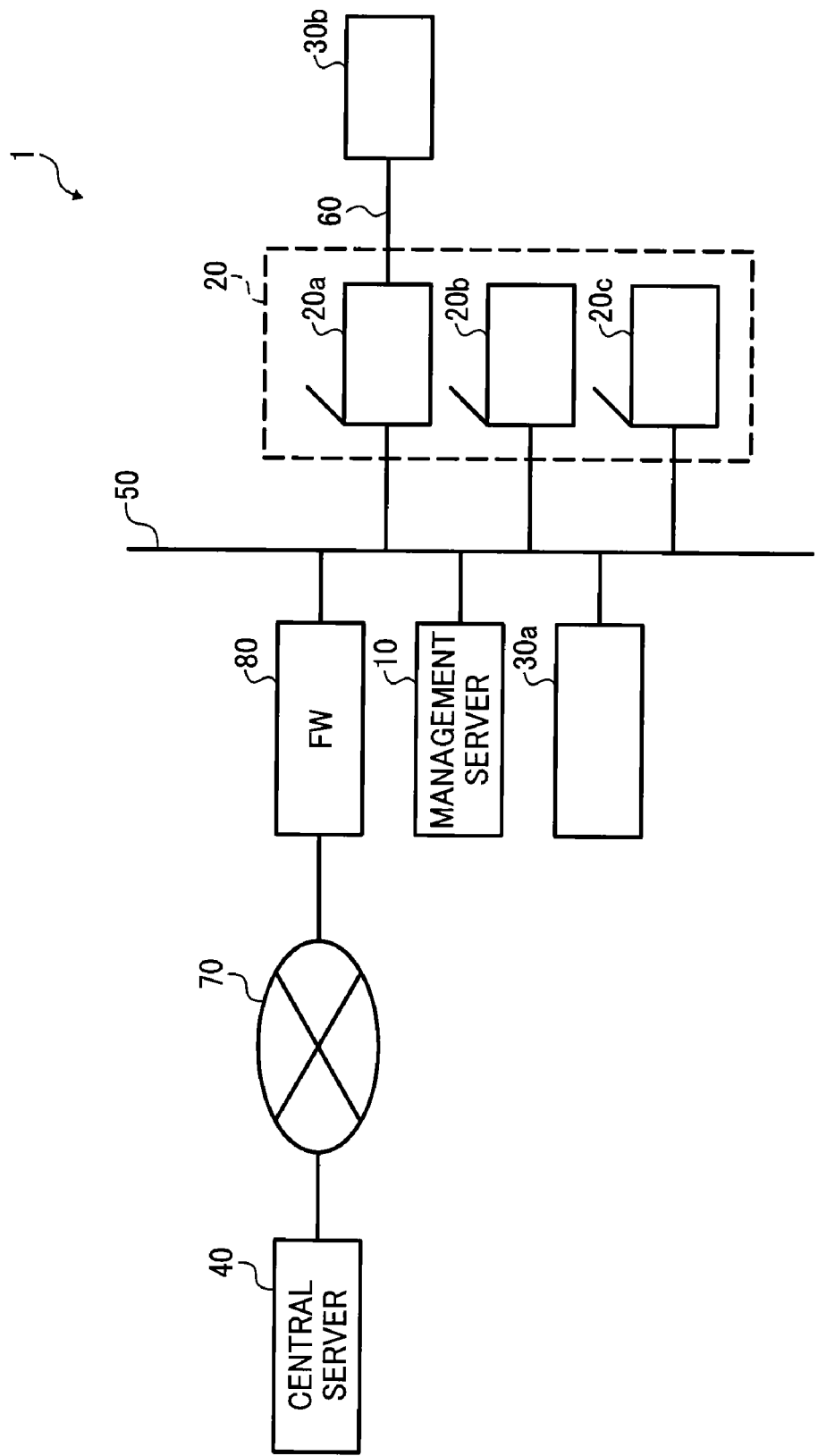

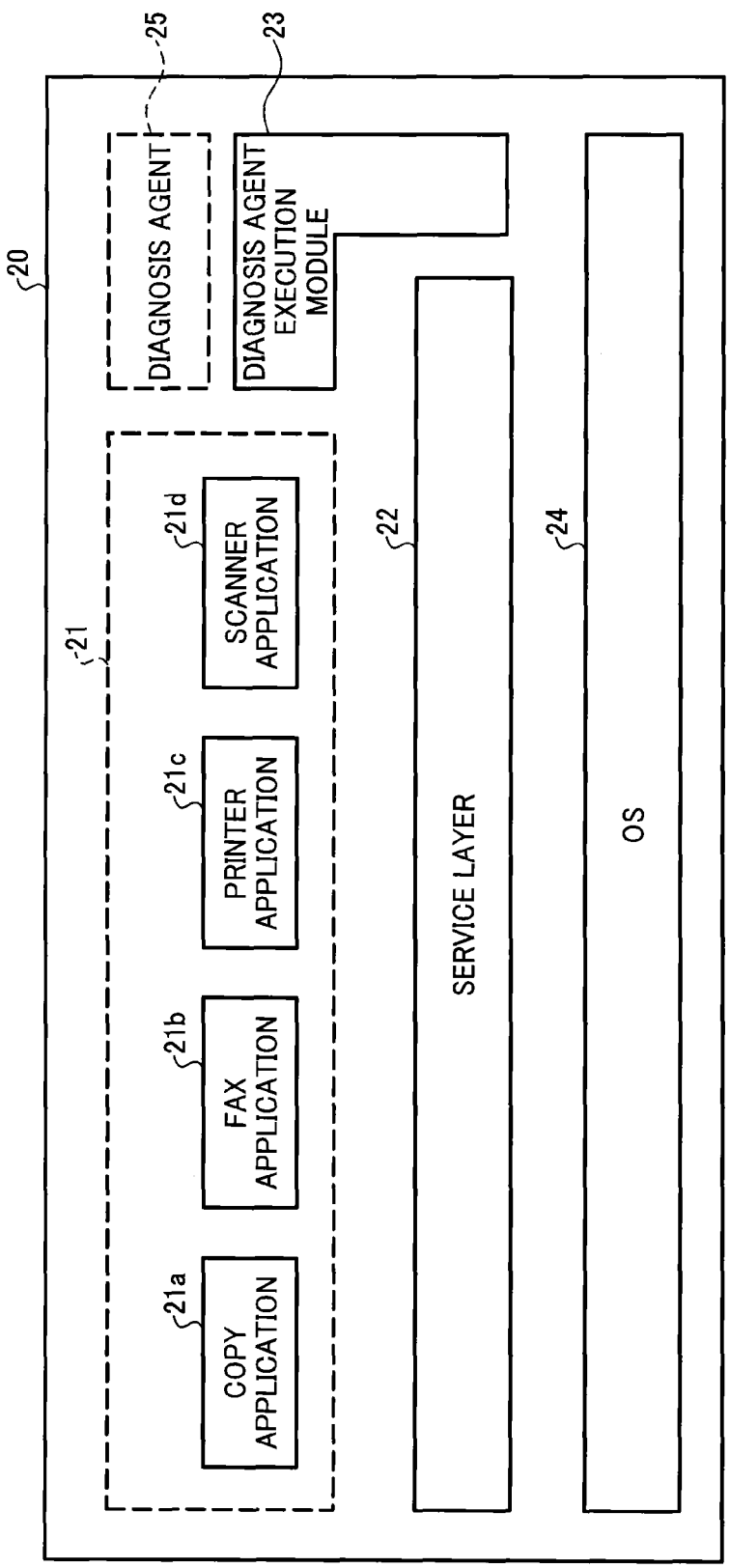

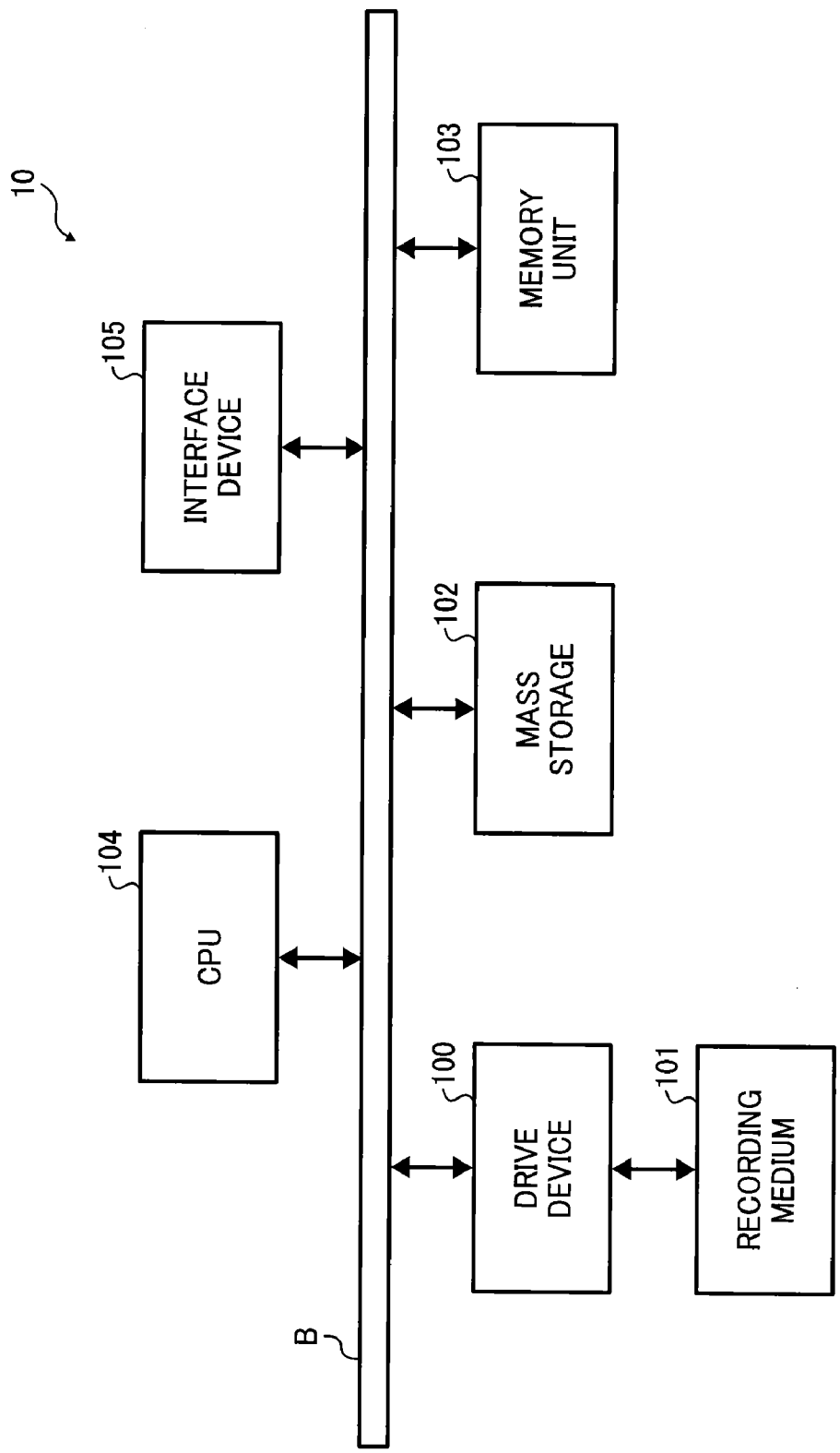

FIG. 6

| PROBLEM IDENTIFICATION | DIAGNOSIS AGENT |
|---|---|
| SC920 ERROR | DP001 |
| SC500 ERROR | DP002 |
| NETWORK COMMUNICATION ERROR | DP003 |
| ⋮ | ⋮ |

FIG. 10

| ERROR CODE | FIRST DIAGNOSIS AGENT | FIRST LOG INFORMATION | SECOND DIAGNOSIS AGENT | SECOND LOG INFORMATION | THIRD DIAGNOSIS AGENT |
|---|---|---|---|---|---|
| EC1001 | DIAGNOSIS AGENT FOR PRINTERS | PRINTING ERROR | AGENT 11 | MEMORY ERROR | AGENT 111 |
| | | | | NETWORK COMMUNICATION ERROR | AGENT 112 |
| | | | | OPERATION PANEL OUTPUT ERROR | AGENT 113 |
| EC1002 | | DRIVER COMMUNICATION ERROR | AGENT 12 | ⋮ | ⋮ |
| EC1003 | | ⋮ | AGENT 13 | ⋮ | ⋮ |
| EC1004 | | ⋮ | AGENT 14 | ⋮ | ⋮ |
| EC1005 | | ⋮ | AGENT 15 | ⋮ | ⋮ |
| EC2001 | DIAGNOSIS AGENT FOR SCANNER | ⋮ | AGENT 21 | ⋮ | ⋮ |
| EC2002 | | ⋮ | AGENT 22 | ⋮ | ⋮ |
| EC2003 | | ⋮ | AGENT 23 | ⋮ | ⋮ |
| EC2004 | | ⋮ | AGENT 24 | ⋮ | ⋮ |
| EC2005 | | ⋮ | AGENT 25 | ⋮ | ⋮ |
| EC3001 | DIAGNOSIS AGENT FOR FAX | ⋮ | AGENT 31 | ⋮ | ⋮ |
| EC3002 | | ⋮ | AGENT 32 | ⋮ | ⋮ |
| EC3003 | | ⋮ | AGENT 33 | ⋮ | ⋮ |
| EC3004 | | ⋮ | AGENT 34 | ⋮ | ⋮ |
| EC3005 | | ⋮ | AGENT 35 | ⋮ | ⋮ |
| EC9009 | DIAGNOSIS AGENT FOR ENGINE | ⋮ | AGENT 99 | ⋮ | ⋮ |

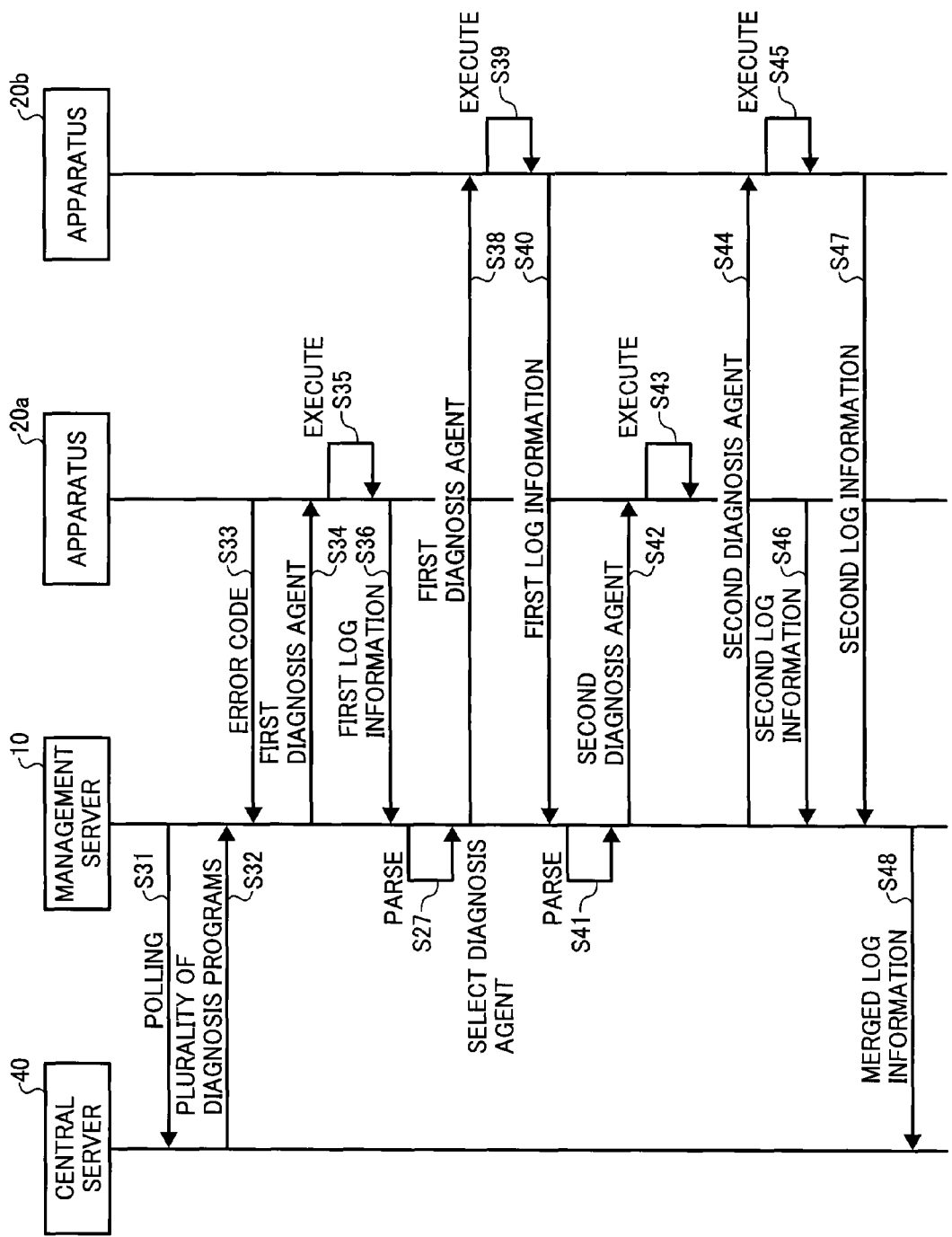

FIG. 13

| APPARATUS 20a | | APPARATUS 20b | |
|---|---|---|---|
| TIME STAMP | LOG | TIME STAMP | LOG |
| 18:27:23' | START PRINT JOB RECEIVE | | |
| 18:27:24' | START SPOOL | | |
| 18:27:25' | FINISH PRINT JOB RECEIVE | | |
| 18:27:26' | TRANSFER PART OF PRINT JOB TO APPARATUS 20b | 18:27:23' | START PRINT JOB RECEIVE |
| 18:27:27' | START 1st PAGE PRINT | 18:27:23' | START SPOOL |
| 18:27:28' | START 2nd PAGE PRINT | 18:27:24' | FINISH PRINT JOB RECEIVE |
| 18:27:29' | START 3rd PAGE PRINT | 18:27:25' | |
| 18:27:30' | START 4th PAGE PRINT | 18:27:26' | START 1st PAGE PRINT |
| 18:27:31' | ERROR | 18:27:27' | START 2nd PAGE PRINT |
| 18:27:32' | | 18:27:28' | START 3rd PAGE PRINT |
| 18:27:33' | | 18:27:29' | START 4th PAGE PRINT |
| 18:27:34' | | 18:27:30' | START 5th PAGE PRINT |
| 18:27:35' | | 18:27:31' | START 6th PAGE PRINT |
| 18:27:36' | | 18:27:32' | START 7th PAGE PRINT |
| 18:27:37' | | 18:27:33' | START 8th PAGE PRINT |
| 18:27:38' | | 18:27:34' | START 9th PAGE PRINT |
| 18:27:39' | | 18:27:35' | START 10th PAGE PRINT |
| 18:27:40' | | 18:27:36' | FINISH PRINT |
| | | 18:27:37' | |
| | | 18:27:38' | |
| | | 18:27:39' | |
| | | 18:27:40' | |

DIAGNOSIS APPARATUS, DIAGNOSIS METHOD, AND STORAGE MEDIUM

CROSS REFERENCE TO RELATED APPLICATIONS

This application is based upon and claims priority under 35 U.S.C. §119 from Japanese Patent Application No. 2007-109550, filed Apr. 18, 2007, and is related to Japanese Laid-Open Patent Application No. 2004-139572, the entire contents of each of which are hereby incorporated by reference.

BACKGROUND OF THE INVENTION

1. Field of the Invention

The present invention generally relates to a diagnosis apparatus for diagnosing a target program, a diagnosis method, and a storage medium, and more particularly, to a diagnosis apparatus and diagnosis method that receive log information from the target program by using a diagnosis program, the diagnosis program acquiring the log information of the target program at runtime and sending the log information to the diagnosis apparatus.

2. Description of the Related Art

When debugging a program of an embedded apparatus such as an image processing apparatus, it is typical to analyze log data including, for example, a variable value of a program or a condition of the apparatus.

A programmer typically uses data output commands (for example, "printf" function in C language) which are embedded in relevant locations in the source code of the program in order to obtain the log data corresponding to the programming in advance of the running of the program. When some problem or abnormal condition occurs in a program, the cause can be discovered or specified by analyzing this log data.

On the other hand, recently in the field of the computer technology, computer program diagnosis technology has been developed that interrupts an execution of the program dynamically (at run time) in order to report data (e.g. a value of a variable) of the program using a diagnosis program.

Depending on this technology, the diagnoses program may be able to execute interrupt diagnosis processing at any step of the program considered to be a diagnosis target (a target program).

At the run time of the target program, when a processing of the target program arrives at the step (a diagnosis point), the diagnosis program can refer to variables of the target program.

When the diagnosis program completes the reporting, the execution returns back to the position that it was at before the reporting occurred.

According to such the technology, log data of the target program is able to be obtained without changing source code, compiling and linking, or re-installing the program.

However, in this related art, the diagnoses program requires re-programming each time a new focus is determined. Further, if the cause cannot be specified based on the first reported data, it would be necessary to revise the diagnoses program repeatedly until the required log data was obtained.

SUMMARY OF THE INVENTION

Embodiments of the present invention provide a diagnosis apparatus, a diagnosis method, and a storage medium containing program code for causing a computer to perform the diagnosis method that solves or reduces one or more problems caused by the limitations and disadvantages of the related art, and promotes productivity of diagnosis of the target program. The present invention may be applied to the target program of an image forming apparatus such as a printer, a copier, a fax, or a scanner.

BRIEF DESCRIPTION OF THE DRAWINGS

FIG. 1 is a diagram showing a configuration of an exemplary diagnosis system according to an embodiment of the present invention;

FIG. 2 is a diagram showing a configuration of an exemplary image processing apparatus according to an embodiment of the present invention;

FIG. 4 is a diagram showing a configuration of an exemplary hardware of the diagnosis apparatus;

FIG. 6 is a diagram showing an exemplary catalogue of a diagnosis agent of the diagnosis system;

FIG. 10 is a diagram showing a configuration of an exemplary corresponding table for selecting a diagnosis agent of the diagnosis system;

FIG. 12 is a sequence chart showing a third exemplary diagnosis system according to an embodiment of the present invention;

FIG. 13 is a diagram showing an exemplary merged log information;

DESCRIPTION OF THE PREFERRED EMBODIMENTS

Figure 3A:
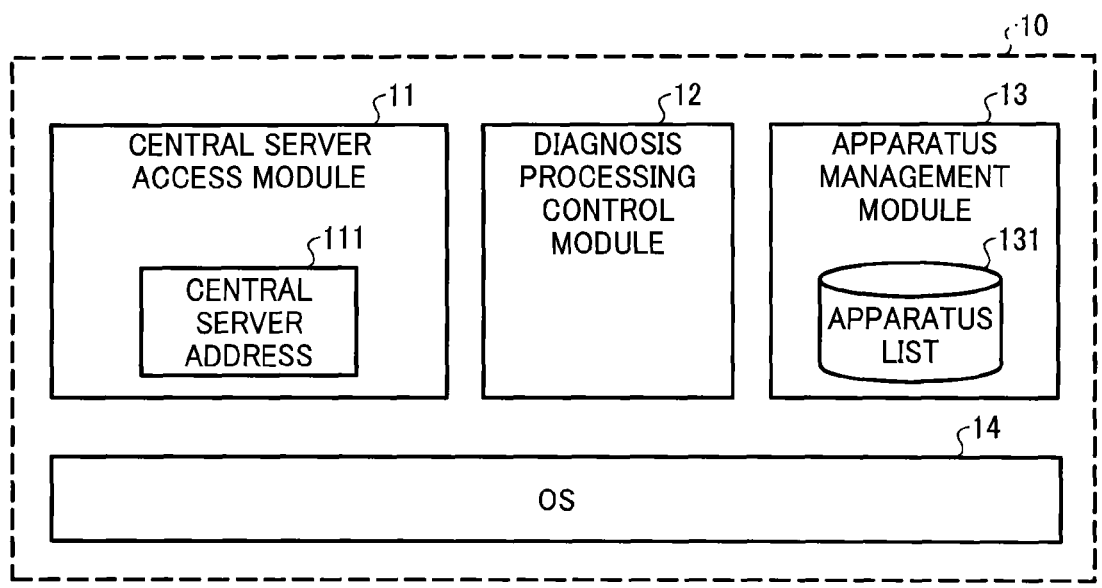
FIG. 3 is a diagram showing a configuration of an exemplary diagnosis apparatus according to an embodiment of the present invention.

Preferred embodiments of the present invention are described below with reference to the accompanying drawings.

FIG. 1 is a diagram showing a configuration of an exemplary diagnosis system 1 according to an embodiment of the present invention.

Referring to FIG. 1, the diagnosis system 1 includes a management server 10, an apparatus 20a, an apparatus 20b, an apparatus 20c ("apparatus 20" when used generally) and a client PC 30a that is connected through a network 50 (via cable or wireless or some other suitable means) such as LAN (Local Area Network). Further, the diagnosis system includes a client PC 30b that is connected to apparatus 20 through a cable 60 which can be, for example, a RS-232C or USB (Universal Serial Bus) cable. Moreover, a central server 40 is connected to the network 50 through a WAN 70 (such as the Internet) and a firewall 80. Client PC 30a and Client PC 30b ("PC 30" when used generally) may display various information relating to the apparatus 20 (apparatus information), or accept input of instructions to the apparatus 20. The client PC 30 may also include a Web browser which can display apparatus information based on HTML (Hyper Text Markup Language) data input from the apparatus 20 or display a Web page whereby instructions may be input into the apparatus 20.

The management server 10 carries out diagnosis of programs and handles control of a diagnosis program which is used in apparatus 20.

For example, the diagnosis of programs includes among other things analyzing the cause of an obstacle (e.g. bugs) in a program. In the present embodiment of the invention, the diagnosis system 1 performs diagnosis for a target program based on log information. It should also be noted that the log information for the program may alternatively be output by another program that operates along with the diagnosis program.

In the present embodiment, it is the diagnosis program that obtains and outputs the log information of the target program, which is hereinafter called "the diagnosis agent".

The Central server 40 manages various diagnosis agents. In the present embodiment, diagnosis agents typically are not created until after some malfunction has occurred, nevertheless various diagnosis agents may be pre-made based on past experience and saved and managed in the central server 40.

FIG. 2 is a diagram which illustrates a configuration of an exemplary image processing apparatus according to an embodiment of the present invention. Referring to FIG. 2, apparatus 20 corresponds to an image processing apparatus that includes a plurality of functions such as a copy, a facsimile, a print and the scan (MFP). Apparatus 20 includes hardware such as a CPU and memory and performs various functions using the CPU in accordance with a program recorded in the memory. In addition apparatus 20 includes software applications 21 such as a copy application 21A, a FAX application 21B, a printer application 21C and a scanner application 21D. Further the software of the apparatus 20 includes a service layer 22, a diagnosis agent execution module 23 and OS (operating system) 24. The copy application 21A is an application which performs a copy function. The FAX application 21B performs a FAX function. The printer application 21C performs a printer function and the scanner application 21D performs a scanner function. In this embodiment, these applications 21 (21A-D) are considered as a whole to be the diagnosis object.

Service layer 22 comprises service programs that provide services (function) shared by the plurality of applications 21. The service programs may include a network communication service providing network connectivity, a storage service used to manage storage devices such as memory or a hard disk drive, a controlling service used to control image processing hardware such as a printer or a plotter, or an operation panel control service used to control an operation panel.

The diagnosis agent execution module 23 is software which provides an execution environment for the diagnosis agent 25. The diagnosis agent execution module 23 manages mapping information (correspondence information) between information of each step in the source code and information regarding an address in the memory for each application 21. The diagnosis agent execution module 23 is able to determine which step is presently running in the source code by watching an address in the memory corresponding to the application 21 using the mapping information. Therefore, the diagnosis agent execution module 23 is able to detect if a step in the application is a diagnosis point (a position in the source code of application 21).

Figure 3B:
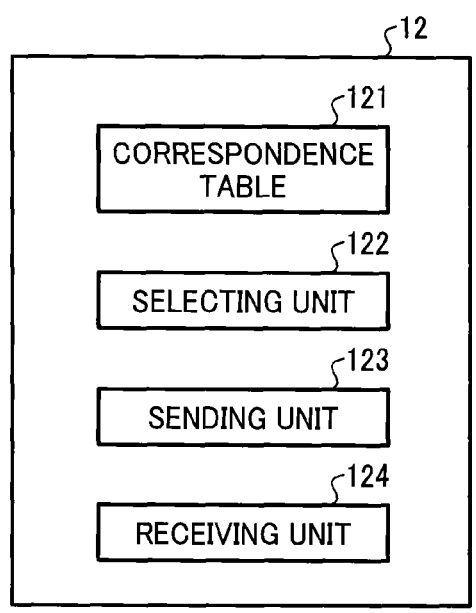

FIGS. 3A and 3B are diagrams showing a configuration of an exemplary diagnosis apparatus according to an embodiment of the present invention.

Referring to FIGS. 3A and 3B, the management server 10 may be comprised of a central server access module 11, a diagnosis processing control module 12, an apparatus management module 13 and OS 14.

The central server access module 11 controls communication with the central server 40. For example, the central server access module 11 downloads (acquires) the diagnosis agent 25 from the central server 40.

The central server access module 11 performs communication with the central server 40 based on a central server address 111 (for example, the address may be URL (Uniform Resource Locator) on the WAN 70) saved in a storage device of the management server 10.

The diagnosis processing control module 12 controls a series of diagnosis processing for application 21 in apparatus 20. The diagnosis processing control module 12 includes a correspondence table 121, a selecting unit 122, a sending unit 123, and a receiving unit 124.

The apparatus management module 13 controls communication with the apparatus 20. The apparatus management module 13 communicates with each apparatus 20 based on an apparatus list 131 which is information which provides correspondence between a name of each apparatus 20 (host name) and an IP address for the network 50 which is saved to a storage device in the management server 10. The OS 14 is an Operating System.

FIG. 4 is a diagram showing an exemplary hardware configuration of the diagnosis apparatus. Referring to FIG. 4, the management server 10 may comprise of devices such as a drive device 100, a mass storage 102, a memory unit 103, a CPU 104, and an interface device 105 which are each connected to bus B.

The program for the management server 10 is read from a recording medium 101 such as a CD-ROM through drive device 100 and is installed to the mass storage 102. The mass storage 102 stores an installed program with all necessary files or data.

According to a start instruction of the installed program, the memory unit 103 stores the installed program read from the mass storage 102. The CPU 104 then executes functions affecting the management server 10 according to commands in the program stored in memory unit 103.

The interface device 105 is used as an interface to connect the diagnosis apparatus to the network 50.

In addition, the program doesn't necessarily have to be installed from the recording medium 101, but may be alternatively be downloaded from other computers via the network 50.

Figure 5:
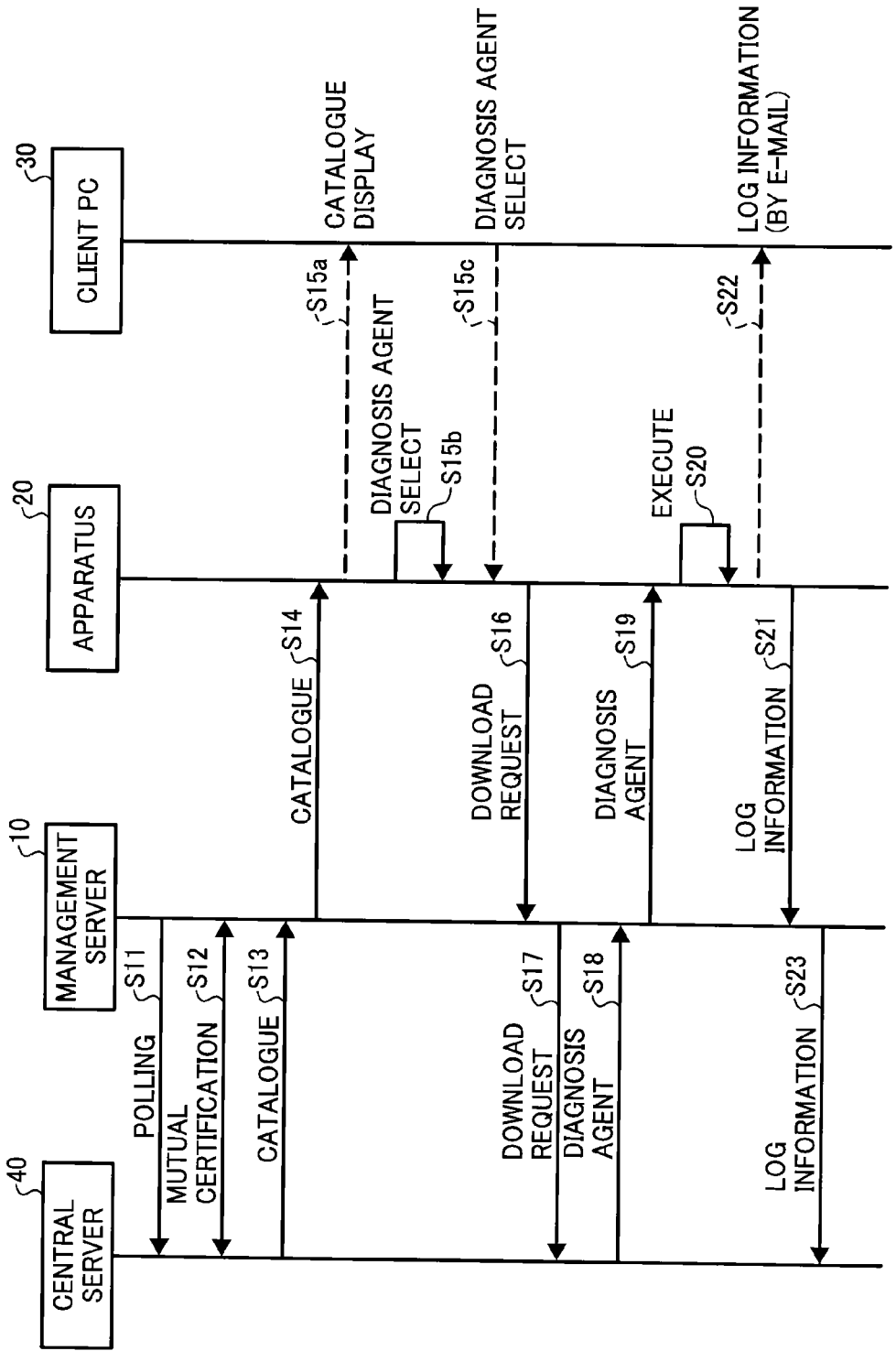
FIG. 5 is a sequence chart showing one exemplary diagnosis system according to an embodiment of the present invention.

A handling procedure of the diagnosis system 1 is specified as follows. FIG. 5 is a sequence chart showing one exemplary diagnosis system 1 according to an embodiment of the present invention Referring to FIG. 5, the management server 10 discovers a flag indicating the existence of an updated version of the diagnosis agent 25 managed by central server 40 by periodical polling the central server 40 (S11).

One reason that the management server 10 polls the central server 40 is because of the existence of the firewall 80. The firewall 80 disturbs active notification of an update from the central server 40 to the management server 10 through the WAN 70. In addition, the update of the diagnostic agent 25 denotes not only providing revised portions of the diagnosis agent 25 but also adding new portions or deleting portions of the diagnosis agent 25 at the central server 40.

In order to determine if there is an update of the diagnosis agent 25 available, mutual certification is performed between management server 10 and central server 40 (S12). When mutual certification has been properly completed, the update flag is checked and a catalogue, e.g. list information of diagnosis agent 25 managed by the central server 40, is sent to the management server 10 from the central server 40 (S13) if an update is available.

FIG. 6 is a diagram showing an exemplary catalogue for the diagnosis agent 25 of the diagnosis system 1. Referring to FIG. 6, the diagnosis agent catalogue includes correspondence information that matches a problem identification with a name of a diagnosis agent or an ID to be attached for diagnosis purposes.

Returning to FIG. 5, the management server 10 then sends the diagnosis agent catalogue to each apparatus 20 (S14). In response, each apparatus 20 stores the diagnosis agent catalogue in a storage device found in the apparatus 20.

Then, when requested by a user the diagnosis agent catalogue is displayed by a Web browser in the operation panel of the apparatus 20 or in the client PC 30. This catalogue enables the diagnostic program 25 to be applied (or to be used) in the apparatus 20 to be selected from the displayed diagnosis agent catalogue (15a, 15b, 15c). Once the diagnostic program 25 is selected, the apparatus 20 notifies the management server 10 of the selected diagnosis agent 25 and requests a download of this diagnosis agent 25 (S16).

The management server 10 then downloads the requested diagnosis agent 25 from the central server 40 (S17, S18) and forwards the downloaded diagnostic program 25 to the apparatus 20 (S19) using sending unit 123.

After receiving the diagnostic program the diagnosis agent execution module 23 of the apparatus 20 executes the diagnostic program 25 (S20) and outputs log information from the diagnosis point of the application 21 (target program) considered to be a diagnosis object. The apparatus 20 then forwards the log information to the management server 10 (S21), and/or to the client PC 30 by e-mail (S22). The receiving unit 124 of the management server 10 receives the log information from the apparatus 20 and forwards the log information to the central server 40 (S23). The log information can then be analyzed at the central server 40 automatically or manually.

Figure 7:
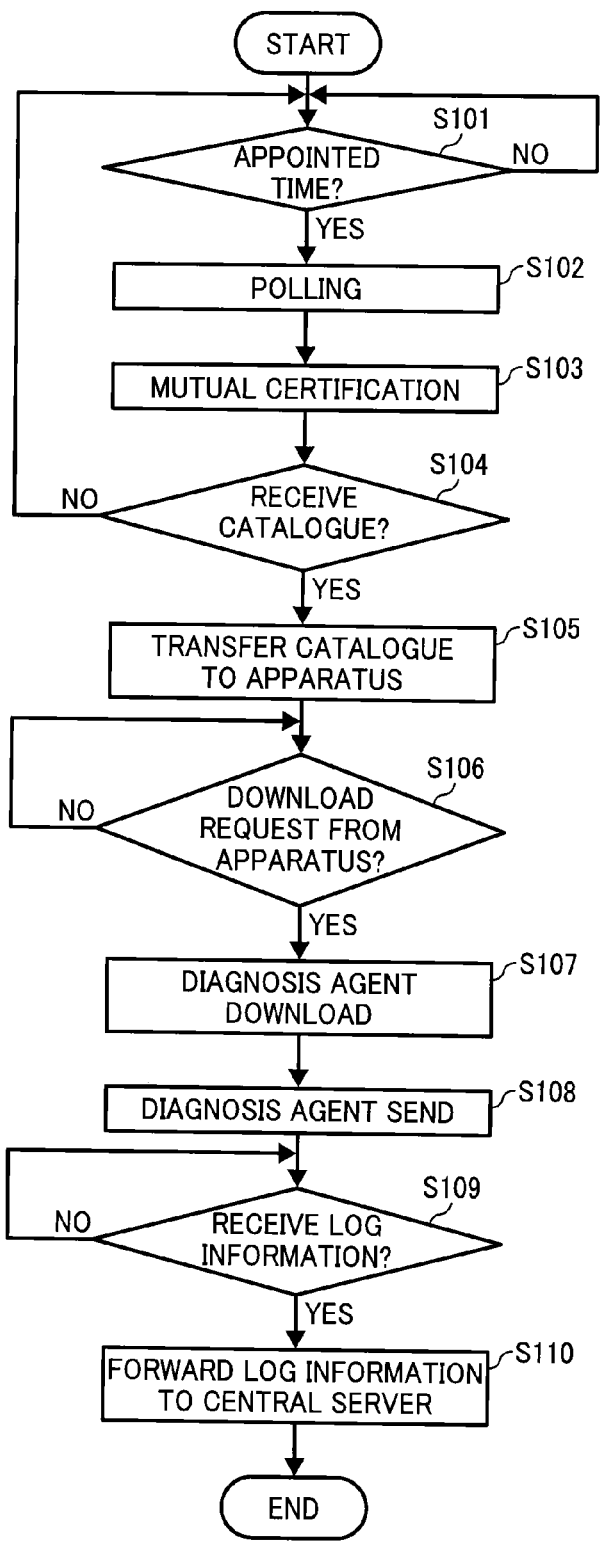
FIG. 7 is a flow chart showing one exemplary diagnosis apparatus according to an embodiment of the present invention.

FIG. 7 is a flow chart showing one exemplary diagnosis apparatus application according to an embodiment of the present invention. In addition, the flow chart illustrates a handling procedure for the management server 10 of the embodiment of the present invention illustrated in FIG. 5.

The diagnosis processing control module 12 of the management server 10 controls the timing of the periodic polling of the central server 40 (S101). Specifically, at the appointed time (Yes), the central server access module 11 polls the central server 40 based on an address 111 provided from diagnosis processing control module 12 and checks an update flag indicator of the diagnosis agent 25 managed by the central server 40 (S102).

In order to check if the update flag indicates an update, the central server access module 11 is mutually certified with the central server 40 (S103). Then if the update flag is determined as indicating an update, the diagnosis agent catalogue is received from the central server 40 (S104). The apparatus management module 13 then transfers the diagnosis agent catalogue to the apparatus 20 registered with the apparatus list 131 (105).

The apparatus management module 13 then receives a transfer request for the diagnosis agent 25 from the apparatus 20 (S106). In response, the central server access module 11 downloads the requested diagnosis agent 25 from the central server 40 based on the request (S107). Finally, the sending unit 123 sends the downloaded diagnosis agent 25 to the apparatus 20 (S108).

After the diagnosis agent 25 is installed in the apparatus 20, the receiving unit 124 receives the log information generated by the processing of the diagnosis agent 25 in the apparatus 20 from a diagnosis agent execution module 23 of the apparatus 20 (S109). The central server access module 11 then forwards the log information to the central server 40 (S110).

Figure 8:
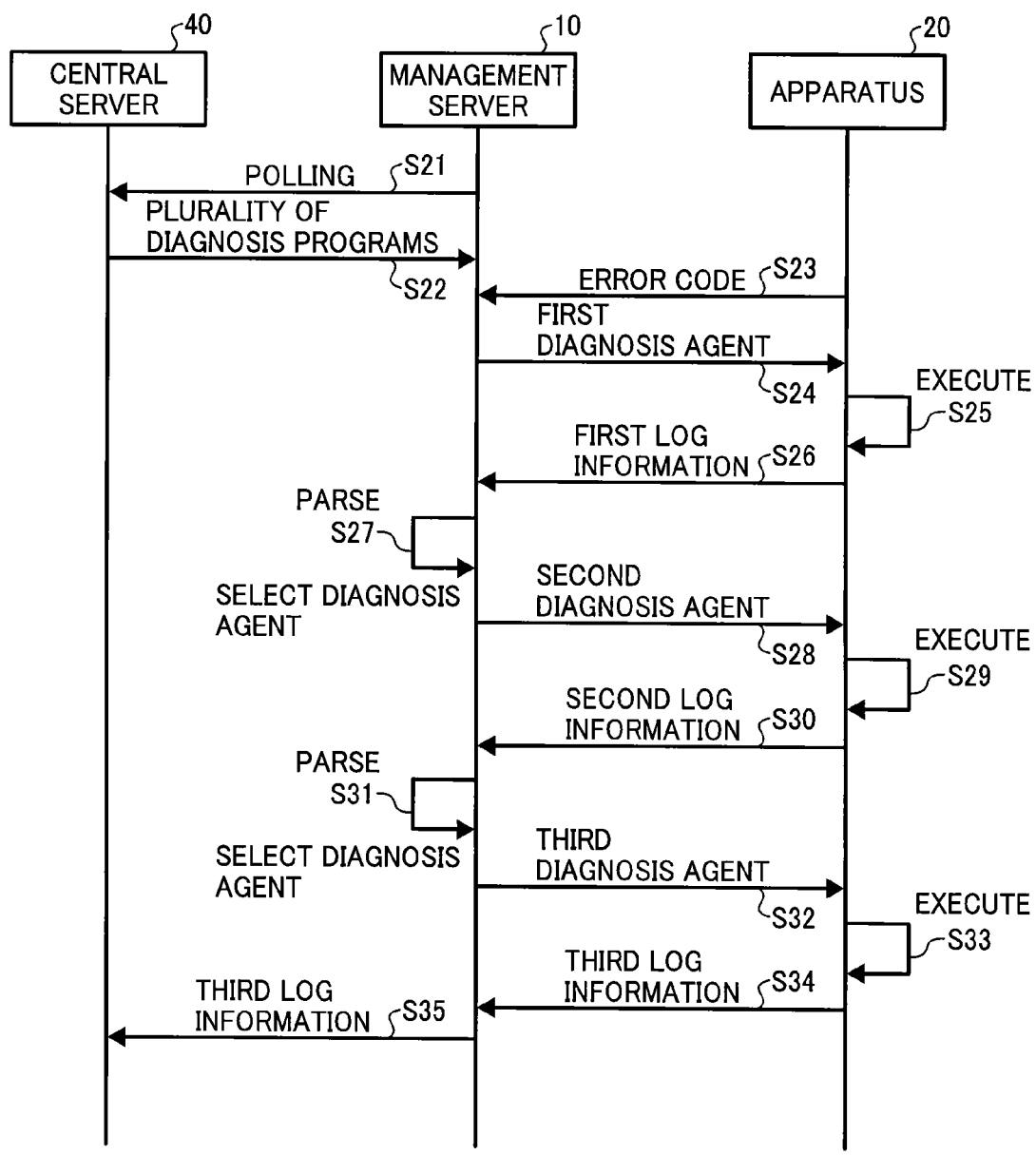
FIG. 8 is a sequence chart showing a second exemplary diagnosis system according to an embodiment of the present invention.

FIG. 8 is a sequence chart showing a second exemplary diagnosis system according to another embodiment of the present invention. Referring to FIG. 8, the management server 10 may download a plurality of diagnosis programs 25 from the central server 40 (S22). All the diagnosis agents 25 managed by the central server 40 may be downloaded in this step, or only the diagnosis agents 25 which have not already previously been downloaded by the management server 10 may be downloaded.

When some kind of problem or error occurs in the apparatus 20, the service layer 22 of the apparatus 20 transmits an apparatus error code, showing states of the apparatus 20, to management server 10 (S23). The selecting unit 122 of the management server 10 then automatically selects a diagnosis agent 25 corresponding to the apparatus error code (hereinafter called "the first diagnosis agent") from the plurality of diagnosis agents stored in the mass storage 102 and forwards the first diagnosis agent to the apparatus 20 (S24).

The diagnosis agent execution module 23 of the apparatus 20 executes the first diagnosis agent at the diagnosis point of the application 21 considered to be a diagnosis object (S25). The first diagnostic program then outputs log information (first log information) to a storage device of the apparatus 20. In addition, the diagnosis point may be set beforehand at the time of generation of the diagnosis agent 25, and/or may be set at run time of the diagnosis agent 25 by, for example, the Web browser of operation panel or the client PC 30. When the diagnosis processing of the first diagnosis agent finishes, the diagnosis agent execution module 23 transfers the first log information to the receiving unit of the management server 10 (S26).

The selecting unit of the management server 10 then parses the received first log information, automatically chooses another diagnostic program based on the parsed first log information in order to output more detailed log information related to the cause of the problem from the diagnosis agents stored to the mass storage 102 (hereinafter called "the second diagnosis agent") (S27). Further, the sending unit 123 sends the selected second diagnostic program to apparatus 20 (S28).

The diagnosis agent execution module 23, in the same way as S25 and S26, executes the second diagnosis agent in the apparatus 20 (S29) and transfers the second log information to the management server 10 (S30).

The selecting unit 122 of the management server 10 parses the second log information, in the same way as S27 and S28 and selects a third diagnostic program (S31). The sending unit 123 then forwards the third diagnostic program to the apparatus 20 (S32).

The diagnosis agent execution module 23, in the same way as S25 and S26, executes the third diagnosis agent in the apparatus 20 (S33) and transfers the third log information to the management server 10 (S34). In this embodiment, the third log information is the most detailed log information.

The management server 10 transfers the third log information to the central server 40 (S35). At the central server 40, the causes of the error can be determined based on an analysis of the third log information. In addition, it is also possible that each of the first log information, second log information, and third log information be transmitted to the central server 40.

Figure 9:
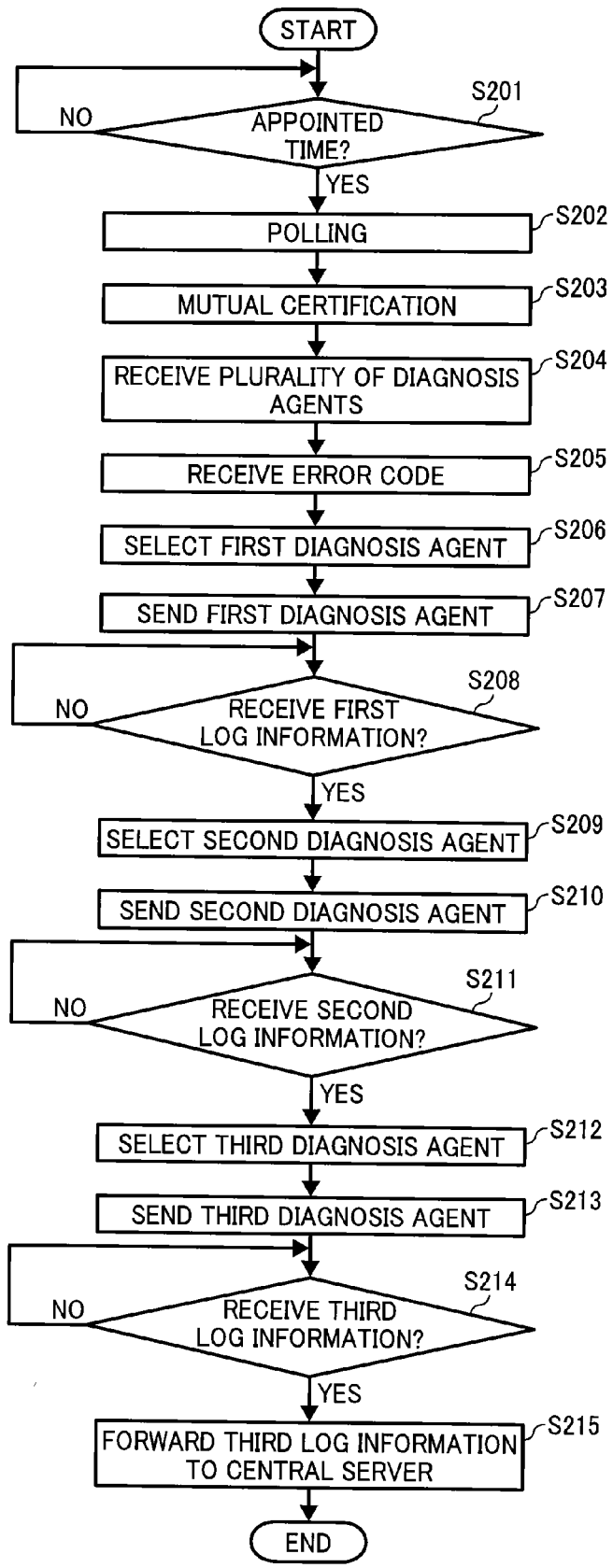
FIG. 9 is a flow chart showing a second exemplary diagnosis apparatus according to an embodiment of the present invention.

FIG. 9 is a flow chart showing the second exemplary diagnosis apparatus processing according to an embodiment of the present invention. Referring to FIG. 9, the diagnosis processing control module 12 of the management server 10 periodically polls the central server 40 (S201, S202). Further, the central server access module 11 mutually certifies with the central server 40 (S203). Once the certification is complete the central server access module 11 receives a diagnosis agent set forwarded from the central server 40 (S204). The apparatus management module 13 then receives an apparatus error code from the apparatuses 20 in which some error has occurred (S205). The diagnosis processing control module 12 then automatically chooses a first diagnosis agent corresponding to the apparatus error code from a diagnostic agent 25 stored to the mass storage 102 (S206). The apparatus management module 13 then transfers the selected first diagnosis agent to the apparatus 20 (S207).

Once the first diagnosis agent is installed and operating, the apparatus management module 13 receives first log information from the apparatus 20 (S208). The diagnosis processing control module 12 then parses the received log information and chooses a second diagnosis agent based on the parsed first log information (S209). The apparatus management module 13 transfers the selected second diagnosis agent to apparatus 20 (S210). In the same way as was described above, the apparatus management module 13 receives the second log information (S211). The diagnosis processing control module 12 then chooses the third diagnosis agent (S212), the apparatus management module 13 transfers the selected third diagnosis agent (S213) and receives the third log information (S214) generated by the third diagnosis agent. The center server access module 11 then transfers the third log information to central server 40.

FIG. 10 is a diagram showing a configuration of an exemplary correspondence table for selecting a diagnosis agent of the diagnosis system. The diagnosis processing control module 12 chooses the diagnosis agent by referring to the correspondence table.

Referring to FIG. 10, the correspondence table 121 comprises a column "apparatus error codes", and a column "first diagnosis agents". This table provides correspondence between the apparatus error codes and the first diagnosis agents. In other words, the first diagnosis agents are matched beforehand to specific apparatus error codes. The diagnosis processing control module 12 can automatically choose a first diagnosis agent using the correspondence table 121.

For example, when the apparatus error code is "EC1001", "EC1002", "EC1003", "EC1004" or "EC1005", a diagnosis agent for printers is selected as the first diagnosis agent. In another example when the apparatus error code is "EC2001", "EC2002", "EC2003", "EC2004" or "EC2005", a diagnosis agent for scanner is selected as the first diagnosis agent.

Furthermore, program 11 which outputs more detailed log information may be selected as the second diagnosis agent when the first log information is a printing error. Alternatively program 12 is selected in case driver communication error. In the same way as was described with the correspondence table mentioned above, each third diagnosis agent is selected based on the second log information.

Figure 11:
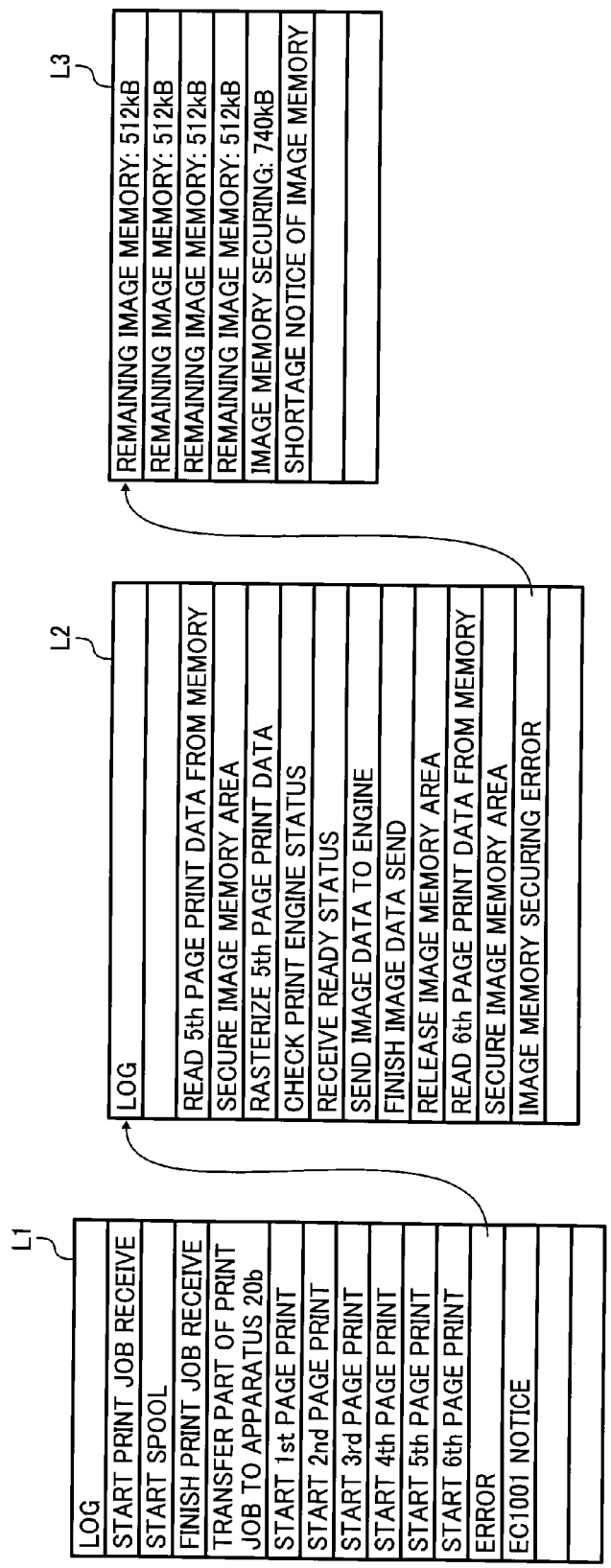
FIG. 11 is a diagram showing an exemplary selecting transaction of the diagnosis agent from the corresponding table.

FIG. 11 is a diagram showing an exemplary selecting transaction of the diagnosis agent using the correspondence table. Referring to FIG. 11, L1, L2, and L3 correspond to sample first log information, second log information, and third log information, respectively.

In the embodiment illustrated in FIG. 11, when an error is detected during the sixth piece printed in the log information L1, L2 is output by selected program 11. In the log information L2, a memory security error is detected, and program 111 is selected as the third program. Log information L3 is then output by the program 111. From parsing L3 it can easily be determined that lack of memory is the essential cause of the error.

In addition, in FIGS. 10 and 11, the correspondence tables are shown corresponding to a letter, but may be described by a code or a sign.

As explained above, the correspondence tables are compounded and go into more detail with each additional diagnosis agent and corresponding log information. As a result of the configuration of the present embodiment of the invention, the efficiency of discovering the cause of an error in program is drastically improved. In addition, in the second embodiment, the correspondence table is illustrated as being compounded to three layers, but the layer depth is able to be modified depending on the problems or conditions in question.

FIG. 12 is a sequence chart showing a third exemplary diagnosis system according to an embodiment of the present invention. In this embodiment, the diagnosis system comprises a plurality of apparatuses 20, which work cooperatively each other. Referring to FIG. 12, there is shown an example where two apparatuses of 20A and 20B divide a printing job cooperatively based on one job request.

In this embodiment the management server 10 carries out periodical polling (S31), downloads diagnosis agent 25 managed by the central server 40, and saves it to mass storage 102 (S32).

When some kind of error such as a program bug of the application 21 occurs, the service layer 22 of apparatus 20A transfers the error code of the error to the management server 10 (S33). The management server 10 then forwards the selected diagnosis agent 25 to the apparatus 20A (S34).

The diagnosis agent execution module 23 of the apparatus 20A carries out a diagnosis using diagnosis agent 25 when an application 21, considered to be a diagnosis object, arrives at the diagnosis point set by the diagnosis agent 25 during execution of the application 21 (S35). The diagnosis agent execution module 23 transfers the log information to management server 10 once the diagnosis agent 25 finishes the diagnosis (S36). The management server 10 then parses the log information and chooses which diagnosis agent should next be executed.

In this embodiment, the diagnosis processing control module 12 of the management server 10 decides that log information from the apparatus 20B is also necessary based on the parse of the log information received from apparatus 20A. Thus, a diagnosis agent to be sent to the apparatus 20B is then selected.

The log information from the apparatus 20A also includes job information, which shows that the current job is a cooperation type job. The diagnosis agent 25 is selected using a correspondence table like the one shown in FIG. 10, which determines an apparatus to send as the diagnosis agent based on the log information. The selected diagnosis agent is then sent to the apparatus 20B (S38).

The diagnosis agent execution module 23 of apparatus 20B transfers log information to the management server 10 (S40) which parses the log information and, if necessary, retrieves second log information from both apparatus 20A and apparatus 20B (S42-S47). FIG. 13 is a diagram showing an example of merged log information.

Referring to FIG. 13, the log information of apparatus 20A and the log information of apparatus 20B are merged based on the time. This merged log information lists the logged actions and errors in chronological order making comparison simple.

Figure 14:
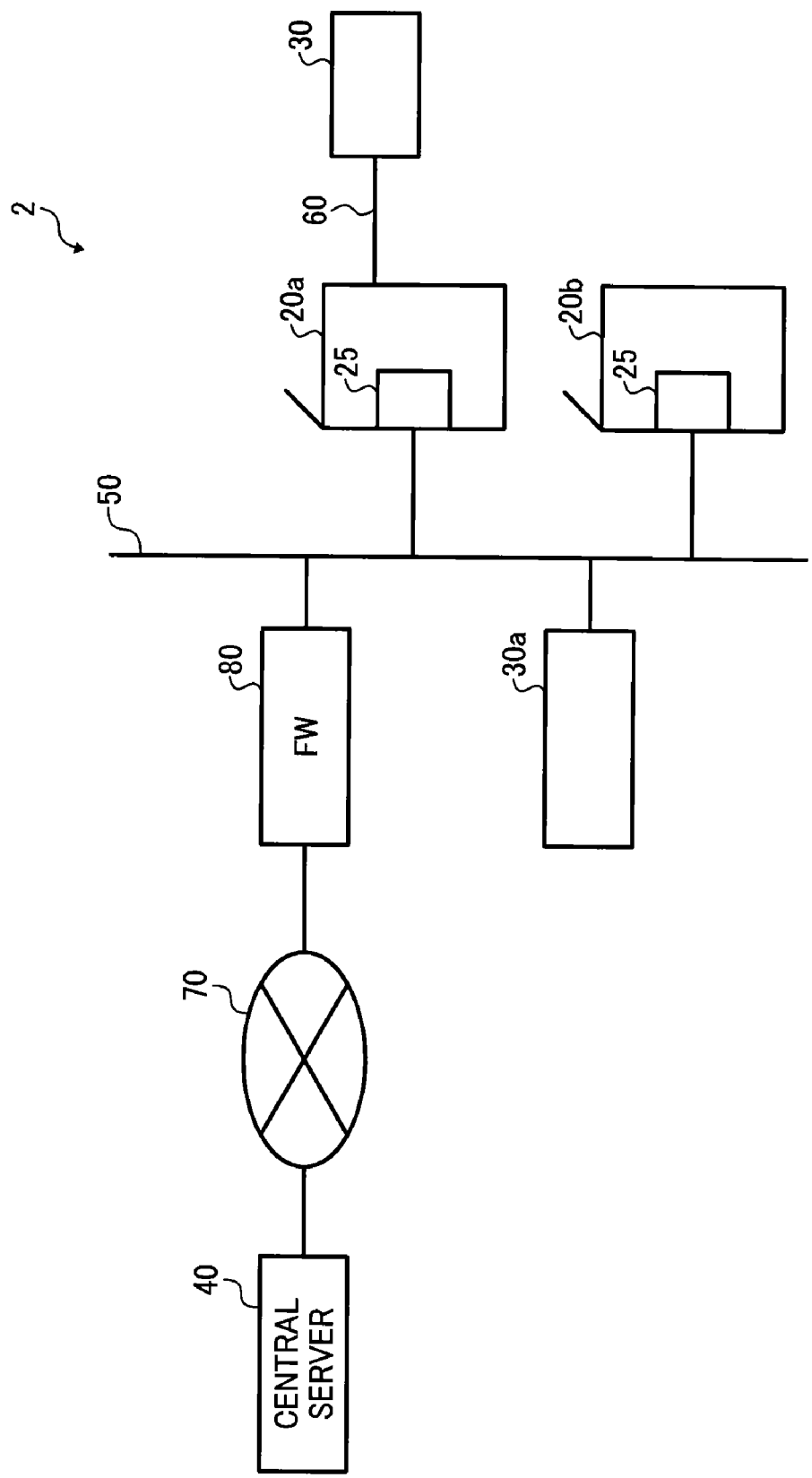
FIG. 14 is a diagram showing a configuration of an exemplary diagnosis system comprising a image processing apparatus including a function of the diagnosis apparatus according to an embodiment of the present invention.

FIG. 14 is a diagram showing a configuration of another exemplary diagnosis system of the invention. In this example an image processing apparatus includes a function of the diagnosis apparatus. The function of the diagnosis apparatus may be carried out using a central server access module 11 and a diagnosis processing control module 12 shown in FIG. 3 in the apparatus 20. In other words, a diagnosis apparatus of this invention is not limited to only being located in a server. Referring to FIG. 14, the same modules have the same numbers as FIG. 1 except that the apparatus 20A and the apparatus 20B each have therein a diagnosis module 25.

As noted above FIG. 4 illustrates a computer system 10 upon which an embodiment of the present invention may be implemented. The computer system 10 includes a bus B or other communication mechanism for communicating information, and a processor/CPU 104 coupled with the bus B for processing the information. The computer system 10 also includes a main memory/memory unit 103, such as a random access memory (RAM) or other dynamic storage device (e.g., dynamic RAM (DRAM), static RAM (SRAM), and synchronous DRAM (SDRAM)), coupled to the bus B for storing information and instructions to be executed by processor/CPU 104. In addition, the memory unit 103 may be used for storing temporary variables or other intermediate information during the execution of instructions by the CPU 104. The computer system 10 may also further include a read only memory (ROM) or other static storage device (e.g., programmable ROM (PROM), erasable PROM (EPROM), and electrically erasable PROM (EEPROM)) coupled to the bus B for storing static information and instructions for the CPU 104.

The computer system 10 may also includes a disk controller coupled to the bus B to control one or more storage devices for storing information and instructions, such as mass storage 102, and drive device 100 (e.g., floppy disk drive, read-only compact disc drive, read/write compact disc drive, compact disc jukebox, tape drive, and removable magneto-optical drive). The storage devices may be added to the computer system 10 using an appropriate device interface (e.g., small computer system interface (SCSI), integrated device electronics (IDE), enhanced-IDE (E-IDE), direct memory access (DMA), or ultra-DMA).

The computer system 10 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 10 may also include a display controller coupled to the bus B to control a display, such as a cathode ray tube (CRT), for displaying information to a computer user. The computer system includes input devices, such as a keyboard and a pointing device, for interacting with a computer user and providing information to the processor. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer system 10 performs a portion or all of the processing steps of the invention in response to the CPU 104 executing one or more sequences of one or more instructions contained in a memory, such as the memory unit 103. Such instructions may be read into the memory unit from another computer readable medium, such as the mass storage 102 or a removable media 101. One or more processors in a multi-processing arrangement may also be employed to execute the sequences of instructions contained in memory unit 103. In alternative embodiments, hard-wired circuitry may be used in place of or in combination with software instructions. Thus, embodiments are not limited to any specific combination of hardware circuitry and software.

As stated above, the computer system 10 includes at least one computer readable medium 101 or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 10, for driving a device or devices for implementing the invention, and for enabling the computer system 10 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the CPU 104 for execution. A computer readable medium may take many forms, including but not limited to, non-volatile media, volatile media, and transmission media. Non-volatile media includes, for example, optical, magnetic disks, and magneto-optical disks, such as the mass storage 102 or the removable media 101. Volatile media includes dynamic memory, such as the memory unit 103. Transmission media includes coaxial cables, copper wire and fiber optics, including the wires that make up the bus B. Transmission media also may also take the form of acoustic or light waves, such as those generated during radio wave and infrared data communications.

Various forms of computer readable media may be involved in carrying out one or more sequences of one or more instructions to the CPU 104 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 10 may receive the data on the telephone line and use an infrared transmitter to convert the data to an infrared signal. An infrared detector coupled to the bus B can receive the data carried in the infrared signal and place the data on the bus B. The bus B carries the data to the memory unit 103, from which the CPU 104 retrieves and executes the instructions. The instructions received by the memory unit 103 may optionally be stored on mass storage 102 either before or after execution by the CPU 104.

The computer system 10 also includes a communication interface 105 coupled to the bus B. The communication interface 104 provides a two-way data communication coupling to a network link 50 that is connected to, for example, a local area network (LAN) 50, or to another communications network 70 such as the Internet. For example, the communication interface 105 may be a network interface card to attach to any packet switched LAN. As another example, the communication interface 105 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 105 sends and receives electrical, electromagnetic or optical signals that carry digital data streams representing various types of information.

The network link 50 typically provides data communication through one or more networks to other data devices. For example, the network link 50 may provide a connection to another computer through a local network 50 (e.g., a LAN) or through equipment operated by a service provider, which provides communication services through a communications network 70. The local network 50 and the communications network 70 use, for example, electrical, electromagnetic, or optical signals that carry digital data streams, and the associated physical layer (e.g., CAT 5 cable, coaxial cable, optical fiber, etc). The signals through the various networks and the signals on the network link 50 and through the communication interface 105, which carry the digital data to and from the computer system 10 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 10 can transmit and receive data, including program code, through the network(s) 50 and 70 and the communication interface 105. Moreover, the network 50 may provide a connection to a mobile device such as a personal digital assistant (PDA) laptop computer, or cellular telephone.

What is claimed is:

1. A diagnosis apparatus for acquiring log information of a target program, comprising:
    a memory unit configured to store correspondence data describing a relationship between a diagnosis program and program selection information, the program selection information used for selecting the diagnosis program;
    a selecting unit configured to select the diagnosis program based on the correspondence data;
    a sending unit configured to send the diagnosis program to a device where the target program is executed in response to the receipt of a diagnosis request, the diagnosis request including information that identifies the target program that is to be diagnosed by the diagnosis apparatus; and
    a receiving unit configured to receive the log information from the diagnosis program, the log information output by the diagnosis program corresponding to the target program,
    wherein the memory unit is further configured to store log correspondence data defining a relationship between the log information, output by the diagnosis program, and an additional diagnosis program,
    wherein the diagnosis apparatus further comprises a selecting unit configured to select the additional diagnosis program based on the log correspondence data that is stored in the memory unit and that defines a corresponding relationship between the additional diagnosis program and the log information, and
    wherein the sending unit is further configured to send the additional diagnosis program.

2. The diagnosis apparatus as claimed in claim 1, wherein the program selection information corresponds to the first log information,
    the sending unit is further configured to send the additional diagnosis program to the device where the target program is executed, and
    the receiving unit is further configured to receive second log information from the additional diagnosis program.

3. The diagnosis apparatus as claimed in claim 1, further comprising:
    an interface unit configured to communicate with a network device through a network;
    wherein the sending unit is further configured to send the diagnosis program to the device where the target program is executed through the network, and
    the receiving unit is further configured to receive the log information from the diagnosis program through the network.

4. The diagnosis apparatus as claimed in claim 1, further comprising:
    an interface unit configured to communicate with a plurality of network devices through a network;
    the device is a first network device including a first target program;
    the sending unit is configured to send the additional diagnosis program to a second network device including a second target program,
    wherein the receiving unit is further configured to receive second log information of the second target program from the additional diagnosis program.

5. The diagnosis apparatus as claimed in claim 3, further comprising:
    a transfer unit configured to transfer the log information to another network device through the network.

6. A diagnosis method for controlling a diagnosis apparatus, wherein the diagnosis apparatus uses a diagnosis program which acquires log information of a target program, said method comprising:
    selecting the diagnosis program based on correspondence data which describes a relationship between program selection information and the diagnosis program, wherein the correspondence data is stored in a memory unit;
    sending the diagnosis program to a device where the target program is executed in response to the receipt of a diagnosis request, the diagnosis request including information that identifies the target program that is to be diagnosed by the diagnosis apparatus;

receiving the log information from the diagnosis program, the log information output by the diagnosis program corresponding to the target program;

selecting an additional diagnosis program based on log correspondence data that is stored in a memory unit and that defines a corresponding relationship between the additional diagnosis program and the log information; and sending the additional diagnosis program.

7. The diagnosis method as claimed in claim 6, further comprising:

sending the additional diagnosis program to the device where the target program is executed; and receiving a second log information from the additional diagnosis program.

8. The diagnosis method as claimed in claim 7, further comprising:

sending the additional diagnosis program to the device where the target program is executed through a network, wherein the device is a network device and includes the target program.

9. The diagnosis method as claimed in claim 7, further comprising:

receiving the log information from the diagnosis program in a first device; and receiving the second log information from the additional diagnosis program on a second device different from the first device.

10. A non-transitory computer readable storage medium having embodied therein program code for causing a computer to execute a diagnosis method for controlling a diagnosis apparatus, wherein the diagnosis apparatus uses a diagnosis program which acquires log information of a target program, said method comprising:

selecting the diagnosis program based on correspondence data which describes a relationship between program selection information and the diagnosis program, wherein the correspondence data is stored in a memory unit;

sending the diagnosis program to a device where the target program is executed in response to the receipt of a diagnosis request, the diagnosis request including information that identifies the target program that is to be diagnosed by the diagnosis apparatus;

receiving the log information from the diagnosis program, the log information output by the diagnosis program corresponding to the target program;

selecting an additional diagnosis program based on log correspondence data that is stored in a memory unit and that defines a corresponding relationship between the additional diagnosis program and the log information; and sending the additional diagnosis program.

* * * * *